US010121191B2

(12) United States Patent
Ninomiya et al.

(10) Patent No.: US 10,121,191 B2
(45) Date of Patent: Nov. 6, 2018

(54) SYSTEM AND METHOD FOR DESIGNING, RECEIVING ORDER OF, AND PLACING PRODUCTION-ORDER OF CUSTOM-MADE FURNITURE AND PROGRAM THEREFOR

(71) Applicants: Kenichi Ninomiya, Tokyo (JP); Hiroyuki Masuda, Tokyo (JP)

(72) Inventors: Kenichi Ninomiya, Tokyo (JP); Hiroyuki Masuda, Tokyo (JP)

(73) Assignee: Domans, Inc., Tokyo (JP)

( * ) Notice: Subject to any disclaimer, the term of this patent is extended or adjusted under 35 U.S.C. 154(b) by 0 days.

(21) Appl. No.: 15/799,622

(22) Filed: Oct. 31, 2017

(65) Prior Publication Data

US 2018/0165755 A1   Jun. 14, 2018

Related U.S. Application Data

(63) Continuation of application No. 15/307,277, filed as application No. PCT/JP2015/059592 on Mar. 27, 2015, now Pat. No. 9,836,782.

(51) Int. Cl.
*G06F 17/00* (2006.01)
*G06Q 30/06* (2012.01)
*G06F 17/50* (2006.01)

(52) U.S. Cl.
CPC ......... *G06Q 30/0643* (2013.01); *G06F 17/50* (2013.01); *G06F 17/5004* (2013.01); *G06Q 30/0621* (2013.01); *G06Q 30/0633* (2013.01); *G06F 2217/02* (2013.01); *G06F 2217/06* (2013.01)

(58) Field of Classification Search
CPC .......... G06Q 30/0643; G06Q 30/0621; G06Q 30/0633; G06F 17/5004
See application file for complete search history.

(56) References Cited

U.S. PATENT DOCUMENTS

2005/0065951 A1\* 3/2005 Liston ............... G06F 17/50
2007/0262982 A1\* 11/2007 Ninomiya .......... G06F 17/5004
345/419

\* cited by examiner

*Primary Examiner* — Abderrahim Merouan
(74) *Attorney, Agent, or Firm* — Osha Liang LLP

(57) ABSTRACT

A method for designing and customizing a furniture product on a screen of a computer comprising displaying a plurality of rectangular parallelepiped spaces as a plurality of part member spaces on a screen, assembling the plurality of part member spaces on the screen such that the plurality of the part member spaces form a furniture product, providing a part member face-correlation between a face of the first part member space and a face of the second part member space that is in parallel with the face of the first part member space, moving the face of the first part member space by a predetermined distances in a perpendicular direction to the face, and displaying a three-dimensional image of the furniture product on the screen after the alteration of dimensions of the part member spaces.

10 Claims, 16 Drawing Sheets

FIG. 5
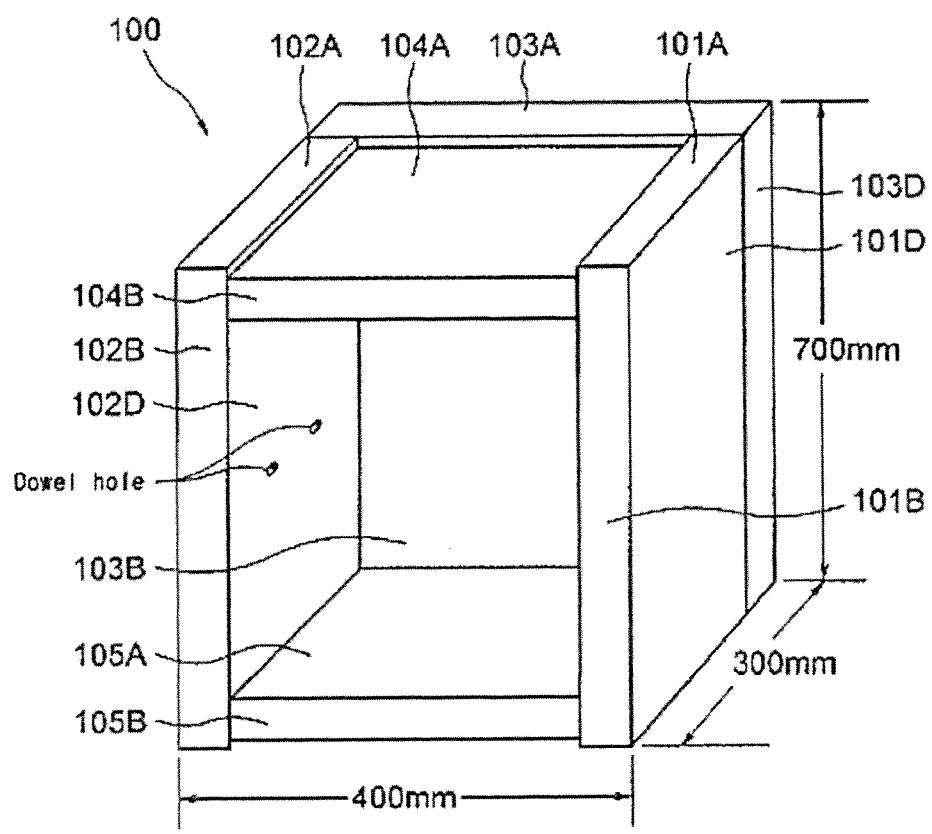
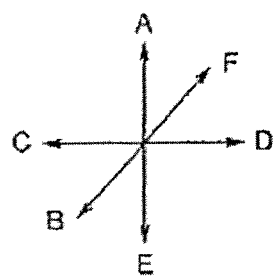

FIG. 6

| | face 1 | face 2 | | | distance | relation between face 1 and face 2 |
|---|---|---|---|---|---|---|
| 1 | left side panel 102 | right side face 102D | top panel 104 | left side face 104C | 0 | same plane |
| 2 | left side panel 102 | right side face 102D | bottom panel 105 | left side face 105C | 0 | same plane |
| 3 | left side panel 102 | left side face 102C | back panel 103 | left side face 103C | 0 | same plane |
| 4 | left side panel 102 | front face 102B | right side panel 101 | front face 101B | 0 | same plane |
| 5 | left side panel 102 | front face 102B | top panel 104 | front face 104B | 0 | same plane |
| 6 | left side panel 102 | front face 102B | bottom panel 105 | front face 105B | 0 | same plane |
| 7 | left side panel 102 | back face 102F | right side panel 101 | back face 101F | 0 | same plane |
| 8 | left side panel 102 | back face 102F | top panel 104 | back face 104F | 0 | same plane |
| 9 | left side panel 102 | back face 102F | bottom panel 105 | back face 105F | 0 | same plane |
| 10 | left side panel 102 | back face 102F | back panel 103 | front face 103B | 0 | same plane |
| 11 | left side panel 102 | upper face 102A | top panel 104 | upper face 104A | 0.5mm | separate |
| 12 | left side panel 102 | upper face 102A | right side panel 101 | upper face 101A | 0 | same plane |
| 13 | left side panel 102 | lower face 102E | bottom panel 105 | lower face 105E | 0.5mm | separate |
| 14 | left side panel 102 | lower face 102E | right side panel 101 | lower face 101E | 0 | same plane |
| 15 | left side panel 102 | upper face 102A | back panel 103 | upper face 103E | 0 | same plane |
| 16 | left side panel 102 | lower face 102E | back panel 103 | lower face 103E | 0 | same plane |
| 17 | right side panel 101 | left side face 101C | top panel 104 | right side face 104D | 0 | same plane |
| 18 | right side panel 101 | left side face 101C | bottom panel 105 | bottom panel 105D | 0 | same plane |
| 19 | right side panel 101 | right side face 101D | back panel 103 | right side face 103D | 0 | same plane |

FIG. 7

| | face 1 | face 2 | distance |
|---|---|---|---|
| 1 | unit upper face (face A) | upper face 102A of left side panel | 0 |
| 2 | unit lower face (face E) | lower face 102E of left side panel | 0 |
| 3 | unit left face (face C) | left face 102C of left side panel | 0 |
| 4 | unit right face (face D) | right face 101D of right side panel | 0 |
| 5 | unit front face (face B) | front face 102B of the left side panel | 0 |
| 6 | unit back face (face F) | back face 103F of back panel | 0 |

FIG. 9

Specification of constituting member (BOM data)

| product No. | unit No. | part No. | part name | | component | width | height | thickness | number of pieces |
|---|---|---|---|---|---|---|---|---|---|
| 001 | 1 | 102 | left side panel | | | 285mm | 700mm | 15mm | 1 |
| 001 | 1 | 102 | left side panel | 1 | solid | 285mm | 700mm | 15mm | 1 |
| 001 | 1 | 101 | right side panel | | | 285mm | 700mm | 15mm | 1 |
| 001 | 1 | 101 | right side panel | 1 | solid | 285mm | 700mm | 15mm | 1 |
| 001 | 1 | 104 | top panel | | | 420mm | 285mm | 15mm | 1 |
| 001 | 1 | 104 | top panel 1 | 1 | solid | 420mm | 285mm | 15mm | 1 |
| 001 | 1 | 105 | bottom panel | | | 420mm | 285mm | 18mm | 1 |
| 001 | 1 | 105 | bottom panel 1 | 1 | solid | 420mm | 285mm | 18mm | 1 |
| 001 | 1 | 103 | back panel | | | 450mm | 700mm | 15mm | 1 |
| 001 | 1 | 103 | back panel | 1 | solid | 450mm | 700mm | 15mm | 1 |
| 001 | 2 | 106 | shelf panel | | | 420mm | 285mm | 15mm | 1 |
| 001 | 2 | 106 | shelf panel | 1 | core | 419mm | 284mm | 10mm | 1 |
| 001 | 2 | 106 | shelf panel | 2 | surface | 419mm | 284mm | 2.5mm | 2 |
| 001 | 2 | 106 | shelf panel | 3 | butt end | 420mm | 15mm | 0.5mm | 2 |
| 001 | 2 | 106 | shelf panel | 4 | butt end | 284mm | 15mm | 0.5mm | 2 |
| 001 | 2 | 107 | dowel | | | 10mm | 20mm | 10mm | 4 |

FIG. 10(A)

Specification of machining (NC data) referring to Fig. 8

| hole | face No. | machining | X | Y | depth | diameter | |
|---|---|---|---|---|---|---|---|
| c | 101C | dowel hole | 54mm | 331mm | 12mm | 7.8mm | transferred from 106D |
| d | 101C | dowel hole | 234mm | 331mm | 12mm | 7.8mm | transferred from 106D |
| a | 106D | dowel hole | 54mm | 7.5mm | 12mm | 7.8mm | |
| b | 106D | dowel hole | 234mm | 7.5mm | 12mm | 7.8mm | |

FIG. 10(B)

| hole | face No. | machining | X | Y | depth | diameter | |
|---|---|---|---|---|---|---|---|
| c | 101C | dowel hole | 54mm | 321mm | 12mm | 7.8mm | |
| d | 101C | dowel hole | 234mm | 321mm | 12mm | 7.8mm | |
| a | 106D | dowel hole | 54mm | 7.5mm | 12mm | 7.8mm | |
| b | 106D | dowel hole | 234mm | 7.5mm | 12mm | 7.8mm | |

FIG. 11(A)
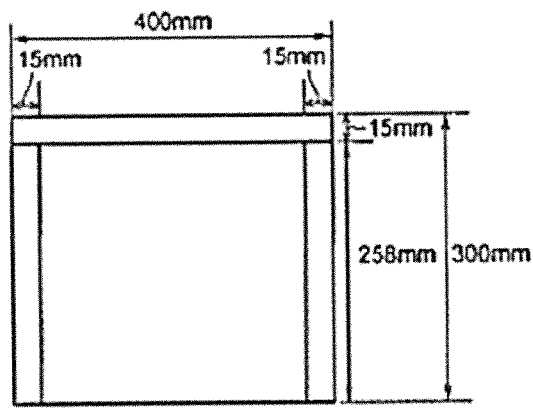
FIG. 11(B) Front view  FIG. 11(C) Right side view
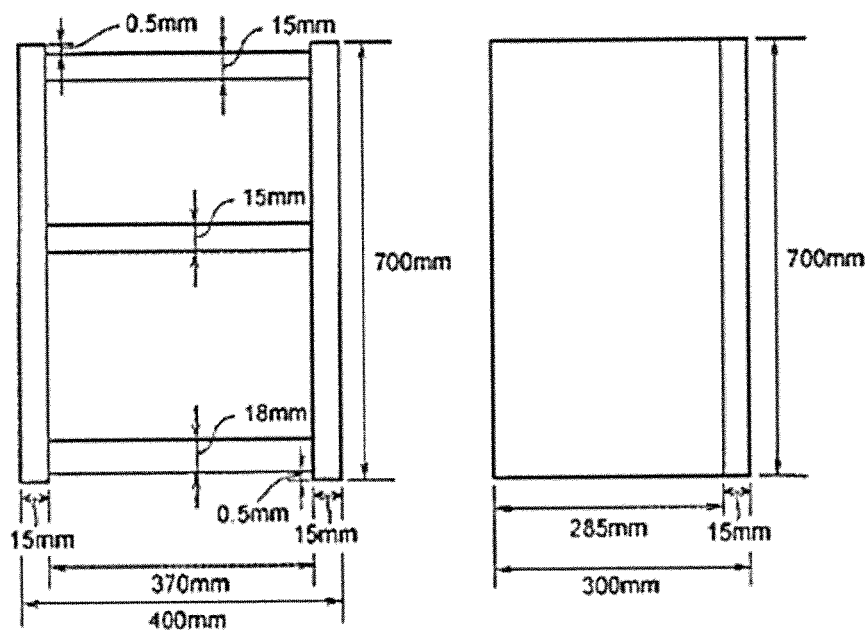

FIG. 12(A) Right side panel    FIG. 12(B) Left side panel
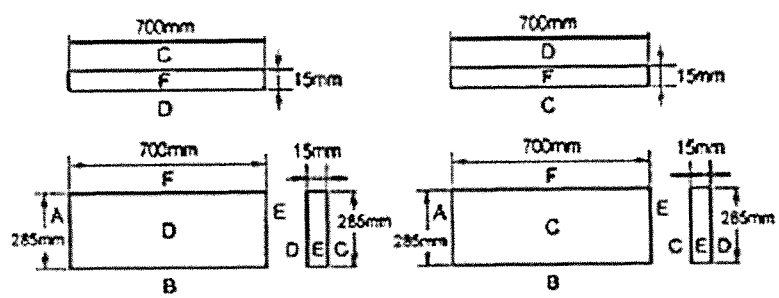
FIG. 12(C) Top panel    FIG. 12(D) Back panel
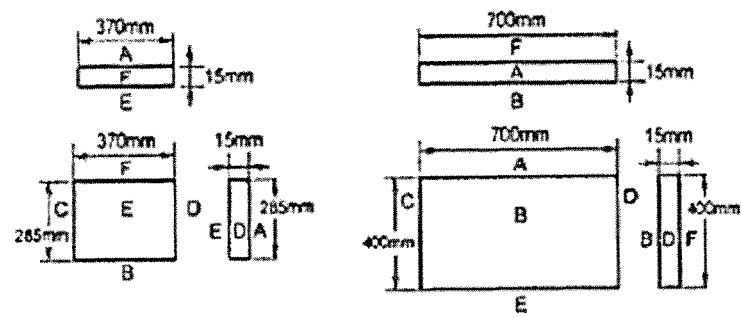
FIG. 12(E) Bottom panel    FIG. 12(F) Shelf panel
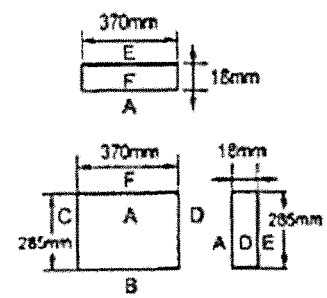
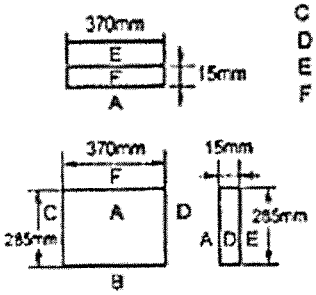
A (upper) surface sheet
B (front) butt end sheet
C (left) butt end sheet
D (right) butt end sheet
E (lower) surface sheet
F (back) butt end sheet

FIG. 15

Master data of price of components and procurement period

| component | size (min.) | size (max.) | price of components | procurement period |
|---|---|---|---|---|
| board 1 | 100mm × 100mm | 900mm × 1800mm | ¥1500/m2 | 3 days |
| core plate 1 | 100mm × 100mm | 900mm × 1800mm | ¥30 × m² | 3 days |
| surface sheet 1 | 100mm × 100mm | 900mm × 1800mm | ¥2000(900 × 1800) | 4 days |
| butt end sheet | 10mm | 100m | ¥17/m | 4 days |
| dowel | — | — | ¥4/piece | 2 days |

FIG. 16

| No. | Name | hole | cutout | diameter/W | Depth/D |
|---|---|---|---|---|---|
| 1 | cutout |  | 1 |  | -1 |
| 2 | t2.5 back panel groove |  | 1 | 3 | 7 |
| 3 | φ8 dowel hole (male) φ8xL30mm | 1 |  | 7.8 | 21 |
| 4 | φ8 dowel hole (female) φ8xL30mm | 1 |  | 7.8 | 12 |
| 5 | remove architrave 49×70 |  | 1 | 49 | -1 |
| 6 | remove for splint 10×50 |  | 1 | 10 | -1 |
| 7 | φ35 hinge-cup hole (blum) | 1 |  | 35 | 12.5 |
| 8 | φ8 hole for driving hinge (blum) | 1 |  | 8 | 12.5 |
| 9 | φ10 hole for driving washer (blum) | 1 |  | 10 | 12.5 |
| 10 | φ7.8 hole for driving latch | 1 |  | 7.8 | 12 |

SYSTEM AND METHOD FOR DESIGNING, RECEIVING ORDER OF, AND PLACING PRODUCTION-ORDER OF CUSTOM-MADE FURNITURE AND PROGRAM THEREFOR

TECHNICAL FIELD

The present invention relates to a system and a method to design, receive an order of, and place a production-order of a custom-made furniture product by using a computer and a program therefor.

BACKGROUND OF THE INVENTION

Because of the need to be placed inside a house, size of furniture must be adjusted to the space of the house. Since residential space is generally narrow in Japan, this need is considerably strong. In order to meet this need, conventional ready-made furniture provides a plurality of types each having a different size so that consumers can choose a type which may fit to the layout or size of their own residential space. However, even though a plurality of types each having a fixed size are provided, range of choice is limited, and thus the needs of customers are not sufficiently met.

As the method to design an article, many methods such as three-dimensional CAD, etc. are known. By these methods, a product with desired specification can be designed by first displaying the entire three-dimensional design of the product of its original standard specification on a PC screen, and then inputting alteration of the specification. Inventor of the present invention once proposed a design system of custom-made furniture, which stores the standard specification data of furniture in a computer, and alters the standard specification data to accord to customers' request (patent document 1).

PRIOR ART DOCUMENT

Patent Document

[Patent document 1] JP. No. 3079206

SUMMARY OF INVENTION

To design and propose a product, three-dimensional image of the product must be shown. In order for the manufacturer to produce the proposed product, all of the data necessary for producing the product must be provided. Generally, manufacturers produce a product based on six-plane drawings which show data of all dimensions and shapes of all part members that include end parts of the furniture (for example, butt end sheet) together with the relationship with surrounding members. Recently, because production of furniture is automated, data needs to be provided to a manufacturer in a form that can be supplied to their existing automated manufacturing system. When producing a product in an automated factory, the computer-processable data must be provided such that boring work, grooving work etc. are done accurately with a predetermined shape and in a predetermined depth on a predetermined position of components which are combined to each other, and hinge metal fittings, etc. are placed. However, if the size or shape of the product are altered in accordance with customers' request, the position to provide a machining and method of machining provided on the component needs to be altered accordingly, which is not easy in practice.

Under the above situation, even though custom-made furniture can be designed three-dimensionally on a PC screen, it has been difficult to produce design information which is necessary for furniture manufacturers to manufacture the product by using their automated manufacturing line.

One or more embodiments of the present invention provides a system to design, receive an order of, and place a production-order of a furniture product with dimensions requested by a customer: a system to design, receive an order of, and place a production-order of a custom-made furniture product, comprising:

part member space production input means for reading out data of a plurality of part members which constitute a furniture product from memory, calculating and displaying on a screen a smallest virtual three-dimensional rectangular parallelepiped that circumscribes each of the plurality of part members as a part member space, and inputting alteration of a dimension of each part member space;

unit space production input means for constituting a unit from the plurality of part members by correlating a face of a part member space with a face of another part member space, calculating and displaying on a screen a smallest virtual three-dimensional rectangular parallelepiped which circumscribes the unit as a unit space, and enabling to input an alteration of a dimension of the unit space;

unit/part member face-correlating means for correlating six faces of the unit space with the faces of the part member spaces of the plurality of part members constituting the unit;

furniture production means for producing a furniture product by combining the unit spaces;

unit space alteration input means for inputting an alteration of a dimension of the unit space;

information processing means for altering a dimension of the plurality of part member spaces which are face-correlated with the six faces of the unit space based on the face-correlation upon receiving the input of alteration of a dimension of the unit space, and calculating the dimensions of the altered product based on the altered dimensions of the unit and the part members;

memory for storing data of a part member, a unit, and a furniture product, and a program necessary for calculating and outputting a result of calculation based on the face-correlation;

output display means for outputting and displaying on a screen a three-dimensional image of the altered furniture product; and furniture production-order means for outputting data of altered dimensions of the part members for each unit and furniture product.

According to one or more embodiments of the present invention, the face-correlation between the faces of the plurality of part member spaces is provided by setting a distance between two mutually parallel faces of the part member spaces.

According to one or more embodiments of the present invention, the information processing means provides a numeric identifier to each of the six faces of the part member space, sets a XY coordinate system wherein one corner of each rectangular face is an origin, and two sides which extend from the corner are set as X-axis and Y-axis, and comprises a circumscribing rectangular parallelepiped calculation section which enables to designate a position on the rectangular face by using the XY coordinate system.

According to one or more embodiments of the present invention, the unit space production input means comprises an attribute input means for inputting an attribute of whether the unit is a parent unit to accommodate another unit in its inner space entirely or partially, or a child unit that is accommodated in the inner space of another unit entirely or partially, and the furniture production means comprises a means to accommodate a child unit having a child attribute in a parent unit having a parent attribute.

According to one or more embodiments of the present invention, the information processing means calculates an accommodation space which is surrounded by a plurality of part member spaces constituting the unit space, alters a dimension of the accommodation space when dimension of the unit space is altered by the unit space alteration input means, and alters dimension of the unit space of another unit which is accommodated therein and inscribing the accommodation space in accordance with the altered dimension of the accommodation space.

According to one or more embodiments of the present invention, the memory stores master data of kinds of machining that are to be provided on a face of a part member.

According to one or more embodiments of the present invention, the system further comprises a part member machining input means for inputting a machining stored in the memory on a position which is designated by a XY coordinate system set on a rectangular face of a part member space.

According to one or more embodiments of the present invention, the information processing means comprises a machining information transfer section for transferring a machining onto a XY coordinate position of a corresponding face of another part member when the machining was input onto a XY coordinate position of a face of a part member space by the part member machining input means.

According to one or more embodiments of the present invention, the furniture production-order means outputs data of dimension of part members of a furniture product, a unit which consist of the part members, and a furniture product which consist of the units together with the data of the part member number, the unit number, and the product number.

According to one or more embodiments of the present invention, data output from the furniture production-order means includes data of machining that is provided on a face of a part member of a furniture product.

According to one or more embodiments of the present invention, the memory stores cost information of part members, core plates and decorative sheet(s), and the information processing means calculates an estimated price of a furniture product by adding wages calculated according to a predetermined rule to the total amount of the part members, the core plates and the decorative sheet(s), and the output display means outputs and displays on a screen the estimated price of the furniture product together with the three-dimensional image the furniture product.

According to one or more embodiments of the present invention, the memory stores procurement periods of a plurality of part members, and a delivery date of a furniture product is determined based on the part member with the longest procurement period among the plurality of part members constituting the furniture product.

According to one or more embodiments of the present invention, the data of part members stored in the memory are shared with a manufacturer of furniture.

One or more embodiments of the present invention further provide a method to design, receive an order of, and place a production-order of a furniture product having dimensions requested by a customer, comprising;

a step for reading out data of a plurality of part members of a furniture product from a memory, calculating and displaying on a screen a smallest virtual three-dimensional rectangular parallelepiped that circumscribes each of the plurality of part members as a part member space of each part member, and inputting an alteration of a dimension of each part member space;

a step for constituting a unit from the plurality of part members by correlating a face of the part member space with a face of another part member space, enabling to input alteration of a dimension of the unit space by calculating and displaying on a screen a smallest virtual three-dimensional rectangular parallelepiped which circumscribes the unit as a unit space;

a step for face-correlating six faces of the unit space with the faces of the part member spaces of the plurality of part members constituting the unit;

a step for producing a furniture product by combining the unit spaces that are constituted by correlating the faces of the plurality of part member spaces;

a step for inputting alteration of dimension of the unit space which is constituted by correlating the faces of the plurality of part member spaces;

a step for altering a dimension of the plurality of part member spaces which are face-correlated with six faces of the unit space based on the face-correlation upon receiving an input of the alteration of the unit space, and calculating the dimensions of the altered furniture product based on the altered dimension of the unit and the part members;

a step for outputting and displaying on a screen a three-dimensional image of the altered furniture product; and a step for outputting the data of dimensions of the part members of the altered furniture product for each unit and furniture product, and transmitting the dimension data output to a furniture manufacturing factory.

According to one or more embodiments of the present invention, the face-correlation between the faces of the plurality of part member spaces is provided by setting a distance between two mutually parallel faces of the part member spaces.

According to one or more embodiments of the present invention, the step for calculating the part member space comprises the step for giving a numeric identifier to each of the six faces of the part member space, setting the XY coordinate system wherein one corner of each of the rectangular faces is an origin, and two sides of the rectangular face extend from the corner as X-axis and Y-axis, and enabling to designate a position on the face by the XY coordinate system.

According to one or more embodiments of the present invention, the step for producing the unit space comprises the step for inputting the attribute of whether the unit is a parent unit to accommodate another unit or a child unit that is accommodated in another unit.

According to one or more embodiments of the present invention, the step for producing the furniture product comprises the step for accommodating a child unit having a child attribute in an inner space of a parent unit having a parent attribute entirely or partially.

According to one or more embodiments of the present invention, the step for producing the furniture product comprises a step for calculating the accommodation space which is surrounded by the plurality of part member spaces constituting the unit space, altering dimensions of the accommodation space when dimension of the unit space are altered, and altering dimension of the another unit which is accommodated therein and inscribes the accommodation space in accordance with the alteration of dimension of the accommodation space.

According to one or more embodiments of the present invention, the step for producing the part member space comprises a step for selecting a machining from a list of machining stored in the memory, and inputting the selected machining onto a face of the part member space.

According to one or more embodiments of the present invention, the step for inputting machining onto a face of the part member space comprises a step of transferring the machining onto a corresponding XY coordinate position of a face of another part member when a machining was input onto a position on a face of a part member.

According to one or more embodiments of the present invention, dimension data transmitted to the furniture manufacturing factory includes the dimension data of the part members of the furniture product, the units which consist of the part members, and the furniture product which consists of the units together with the data of the part member number, the unit number, and the product number together.

According to one or more embodiments of the present invention, the dimension data transmitted to the furniture manufacturing factory comprises data of the machining which are provided on the part member of the furniture product.

According to one or more embodiments of the present invention, data of the furniture product output and displayed three dimensionally on the screen is calculated by adding wages to the total amount of the part members, and the decorative sheet(s)s in accordance with a predetermined rule, and the data is displayed on a screen together with the three-dimensional image of the altered furniture product.

According to one or more embodiments of the present invention, the output data displayed on a screen together with the three-dimensional image of the furniture product includes the delivery date of the furniture product determined based on the part member with the longest procurement period among the plurality of part members used for the production of the furniture product.

One or more embodiments of the present invention further provide a program for a computer to perform the functions of the means of the system, or for a computer to perform the steps of the method.

One or more embodiments of the present invention further provide a system to provide a machining on a face of a part member, comprising:

memory for storing master data of a plurality of machinings to be provided on a face of a part member;

information processing means for setting a XY coordinate system on the face of a part member, wherein one corner of a rectangular face is an origin, and two sides extend from the origin as X-axis and Y-axis, and executing a calculation to designate a position on the rectangular face by the XY coordinate system;

machining input means for selecting a machining from master data of the plurality of machinings stored in the memory, and providing the selected machining on the position designated by the XY coordinate system on the rectangular face of the rectangular parallelepiped;

display means for displaying a three dimensional image of the part member having the face on which the machining is provided; and machining output means for outputting the machining provided on a face with the XY coordinate position on which the machining is provided and the dimensions of the part member.

According to one or more embodiments of the present invention, the part member is approximately rectangular parallelepiped shape.

According to one or more embodiments of the present invention, the machinings stored in the memory comprises a cutout work, a boring work, and a grooving work of a panel.

According to one or more embodiments of the present invention, the information processing means comprises a means for transferring the machining provided on the face of a part member onto a face of another part member which is connected to the part member.

One or more embodiments of the present invention further provide a method to provide a machining on a face of a part member, comprising:

a step for setting a XY coordinate system wherein one corner of a rectangular face of a part member is an origin, and two sides extending from the origin are X-axis and Y-axis, and designating a position on a rectangular face on which the machining is provided by the XY coordinate system;

a step for selecting a machining from master data of the plurality of machinings stored in the memory, and providing the selected machining on a position designated by the XY coordinate system on a rectangular face of a rectangular parallelepiped;

a step for displaying a three dimensional image of the part member having a face on which the machining is provided; and a step for outputting the machining provided on the rectangular face together with the XY coordinate position of the machining and the dimensions of the part member.

According to one or more embodiments of the present invention, the member is approximately rectangular parallelepiped shape.

According to one or more embodiments of the present invention, the machining stored in the memory comprises a cutout work, a boring work, and a grooving work of the panel.

According to one or more embodiments of the present invention, the method comprises a step for transferring the machining provided on the face onto a face of another part member which is connected to the part member.

One or more embodiments of the present invention further provide a method of designing a furniture product by using a composite panel, comprising:

calculating a virtual three dimensional circumscribing rectangular parallelepiped of approximately rectangular parallelepiped core plate, a surface sheet to be attached to a top and bottom face of the core plate, and a butt end sheet to be attached to a section of the core plate, and setting a core plate space, a surface sheet space, and a butt end sheet space as part member spaces respectively;

correlating a face of the surface sheet space with either or both of the core plate space and a butt end sheet space such that distance between the two mutually parallel faces is zero;

correlating a face of the butt end sheet space with one or a plurality of sections of the core plate space and the surface sheet space such that the faces are in parallel to each other;

producing a composite panel space by the core plate space, the surface sheet space, and the butt end sheet space;

producing a unit space by using the composite panel space as a part member space; and designing a furniture product by combining the unit spaces.

According to one or more embodiments of the present invention, thickness of the core plate, the surface sheet, or the butt end sheet of the composite panel can be altered.

According to one or more embodiments of the present invention, face-correlation is provided between a face of the core plate space and a face of the surface sheet space, between faces of the core plate space and a face of the butt end sheet space, or between the two faces of the butt end sheet spaces.

According to one or more embodiments of the present invention, the face correlation is provided such that one face of the core plate space is correlated with a face of the surface sheet space and that of the butt end sheet space at a distance zero.

Advantage of Invention

One or more embodiments of the present invention make it possible to automatically produce production data necessary for the manufacturer to produce a furniture product having a shape and dimensions that was three-dimensionally designed and proposed.

One or more embodiments of the present invention make it possible to immediately confirm whether the manufacturer can produce the product with altered specification within the price and the delivery date requested by a customer, when dimensions or the design of the product was altered from standard specification.

One or more embodiments of the present invention make it possible to automatically produce various machining data which are to be provided on the furniture components, and supply the data to a furniture manufacturing factory.

One or more embodiments of the present invention make it possible to quickly produce the product of the design and the dimensions of a furniture product which meet the customers' request at inexpensive price by connecting the designing of a product with production line of the furniture product.

BRIEF DESCRIPTION OF THE DRAWINGS

FIG. 5 shows a cabinet of the bookshelf in FIG. 4.

FIG. 6 shows the face-correlation provided between the part members of the cabinet in FIG. 5.

FIG. 7 shows the unit/part member face-correlation provided between the six faces of the unit and the faces of the part members of the cabinet in FIG. 5.

FIG. 9 shows an example of the bill of materials data (BOM data) of the bookshelf designed by using the system which is one embodiment of the present invention.

FIG. 10(A) shows an example of the machining data (NC data) provided on a face of the part member of the cabinet of the bookshelf designed by using the system which is one embodiment of the present invention. FIG. 10(B) shows an example of the machining data (NC data) of the bookshelf designed by using the system which is one embodiment of the present invention when the shelf panel 106 is moved downward by 10 mm.

FIG. 11(A) shows a plan view of the bookshelf designed by the system which is one embodiment of the present invention. FIG. 11(B) shows a front view of the bookshelf designed by using the system which is one embodiment of the present invention. FIG. 11(C) shows a right side view of the bookshelf designed by using the system which is one embodiment of the present invention.

FIG. 12(A) shows a trihedral figure of the right side panel of the cabinet of the bookshelf designed by using the system which is one embodiment of the present invention. FIG. 12(B) shows a trihedral figure of the left side panel of the cabinet of the bookshelf designed by using the system which is one embodiment of the present invention. FIG. 12(C) shows a trihedral figure of the top panel of the cabinet of the bookshelf designed by using the system which is one embodiment of the present invention. FIG. 12(D) shows a trihedral figure of the back panel of the cabinet of the bookshelf designed by using the system which is one embodiment of the present invention. FIG. 12(E) shows a trihedral figure of the bottom panel of the cabinet of the bookshelf designed by using the system which is one embodiment of the present invention. FIG. 12(F) shows a trihedral figure of the shelf panel of the cabinet of the bookshelf designed by using the system which is one embodiment of the present invention.

FIG. 15 shows an example of master data of price and the procurement period of the part members of the furniture product designed by using the system which is one embodiment of the present invention.

FIG. 16 shows an example of the master data of the machining which is stored in the memory in one embodiment of the present invention.

EMBODIMENT OF INVENTION

Embodiments of the present invention are explained in detail with reference to the drawings as follows.

Definition

"Furniture" in an embodiment of the present invention broadly refers to housing facility such as a storage shelf, a kitchen cabinet, a unit bath, etc. A part member of a furniture product is usually made of wood, but it is not limited to any particular material. Plastics, metal, stone, marble, or glass may also be used.

"Circumscribing rectangular parallelepiped" in an embodiment of the present invention refers to the smallest virtual three-dimensional rectangular parallelepiped that circumscribes a member. For example, if a part member is a rectangular parallelepiped panel with 700 mm in length, 285 mm in width, and 15 mm in thickness, the space having the dimensions of the contour of that panel is a circumscribing rectangular parallelepiped space of that part member. If a part member is non-rectangular parallelepiped member such as a hinge metal fitting, the smallest rectangular parallelepiped that accommodates the metal fitting is the circumscribing rectangular parallelepiped of that part member. Regarding one or more embodiments of the present invention, because a furniture product is produced by combining members on a PC screen, a part member of the furniture product may be referred as a circumscribing rectangular parallelepiped. For convenience of explanation, terms such as panel, metal fitting, surface sheet, core plate, butt end sheet, or part member, may sometimes be used in the meaning of circumscribing rectangular parallelepiped of those members.

"Part member" in an embodiment of the present invention refers to a member, such as panel or metal fitting, etc. which constitutes a unit. Generally one unit consists of a plurality of part members. However, in some cases, a single panel, for example, a counter top panel or a shelf panel of a bookshelf perform a function and may alone form one unit.

"Part member space" in an embodiment of the present invention refers to the smallest virtual three-dimensional rectangular parallelepiped that circumscribes a part member. The dimensions of a part member space is usually the same as the dimensions of the part member if the part member is rectangular parallelepiped shaped. However, dimensions of the part member space may be set smaller or larger than those of the part member. For convenience of explanation, terms such as panel, metal fitting, core plate, surface sheet, butt end sheet, or part member may sometimes be used in the same meaning as a space of each of those members. A face of a part member space is face-correlated with a face of another part member space to form a unit space.

Figure 4:
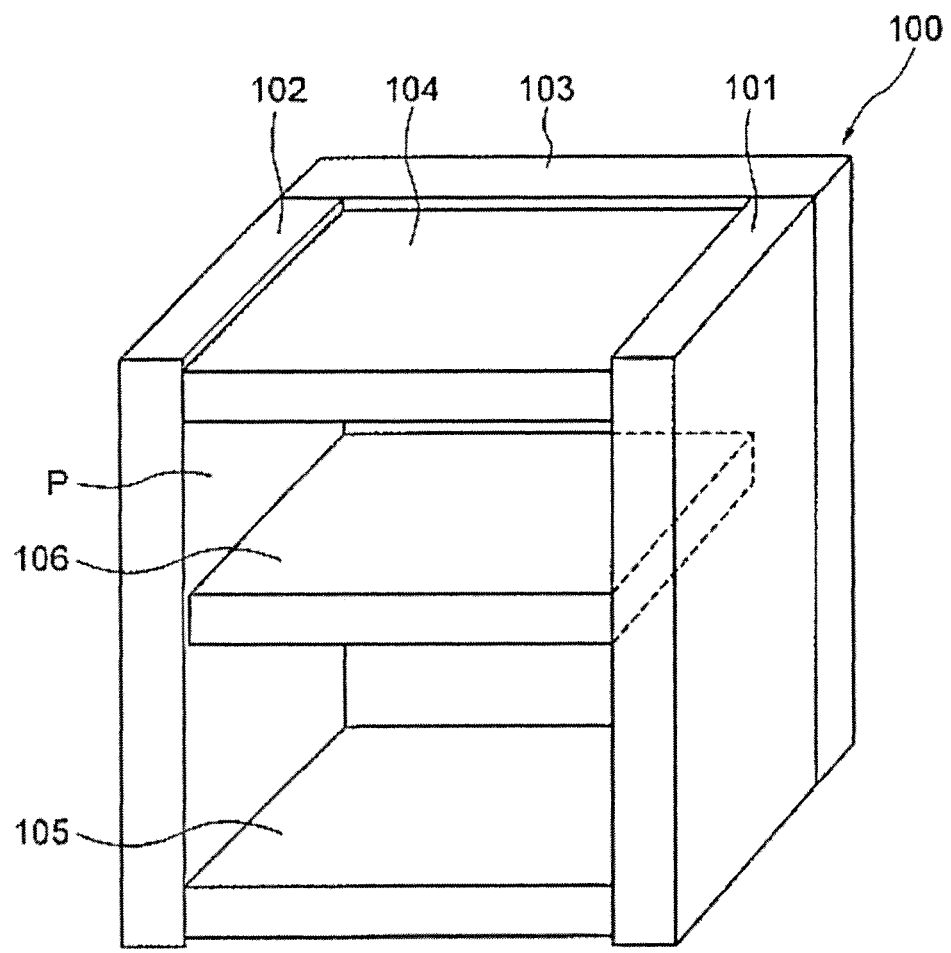
FIG. 4 shows a bookshelf designed by using a system according to one or more embodiments of the present invention.

"Unit" in an embodiment of the present invention refers to an article, such as cabinet, drawer, etc, which is composed of one or a plurality of part members which are combined so as to perform a function. For example, cabinet 100 shown in FIG. 4 is a unit composed of five panels of right and left side panels, a bottom panel, a top panel, and a back panel, which are combined to perform an accommodating function. Shelf panel 106 is a unit using a composite panel which is constituted by surface sheet(s), butt end sheet(s), and a core plate. In the example of FIG. 4, after dowel work is provided and accommodated in another unit i.e. cabinet 100, shelf panel 106 performs a function of supporting.

"Unit space" in an embodiment of the present invention refers to the smallest virtual three-dimensional rectangular parallelepiped that circumscribes a unit which is composed of one or a plurality of part members. Unit space is defined by correlating six faces of a unit space with faces of part member spaces of part members constituting the unit. After face-correlation is input, if the alteration of dimension of the unit space is input, dimension of a part member space which is face-correlated with a unit space is altered correspondingly. If the unit is a rectangular parallelepiped, the dimensions of the unit space are usually set to be the same as the dimensions of the unit. However, unit space may be set as a rectangular parallelepiped which is smaller or larger than the unit. For example, in FIG. 4, shelf panel 106 is accommodated in cabinet 100 by giving parent-child relationship between the accommodation space of cabinet 100 and the unit space shelf of panel 106. In this case, instead of using the unit space of shelf panel 106 as a child, a unit which is slightly wider in lateral directions than shelf panel 106 may be used as a child so that necessary clearance is created for inserting the shelf panel into the cabinet smoothly. For convenience of explanation, the term "unit" in an embodiment of the present invention may sometimes be used to mean "unit space".

Figure 13A:
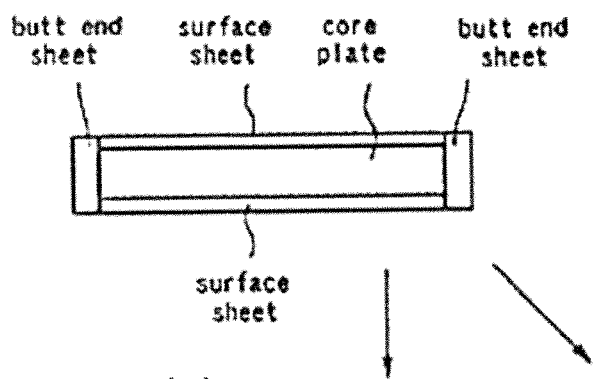
FIG. 13(A), FIG. 13(B), or FIG. 13(C) show an different example of the virtual circumscribing rectangular parallelepiped of a core plate, surface sheets, and a butt end sheet when the composite panel is used as a panel in one embodiment of the present invention.

"Composite panel" in an embodiment of the present invention refers to a panel which is composed of a plurality of components as exemplarily shown in FIG. 13(A), in which a surface sheet such as poly plywood is attached on a surface of core plate, and a butt end sheet such as tape is attached on a cross section of the core plate. "Core plate" refers to a component on which a surface sheet and a butt end sheet are attached. A surface sheet and a butt end sheet which are attached on a core plate are collectively referred as "decorative sheet(s)". Regarding one or more embodiments of the present invention, core plate, surface sheet, and butt end sheet are all part members, and these part members' spaces constitute "composite panel space", which is also a part member space, by combining the components together by using the technique of face-correlation. By setting spaces of decorative sheet(s) and core plate, and producing a part member space (composite panel space) by face-correlating these spaces each other in this manner, efficiency of designing a furniture product can be greatly enhanced. Further, by calculating the spaces of "core plate", "surface sheet", and "butt end sheet" which are the minimum constituent members of a furniture product, and combining these spaces together by using the technique of face-correlation, a part member space called "composite panel space" is constituted. And a unit space is formed by face-correlating this part member space with another part member space. By this method, it becomes possible to output a bill of materials (BOM) which is a list of minimum constituent members of a furniture product. For convenience of explanation, the term "composite panel" in an embodiment of the present invention may sometimes be used to mean "circumscribing rectangular parallelepiped of the composite panel (part member space)".

"Furniture product" in an embodiment of the present invention refers to a furniture product produced by combining a plurality of units. Combining the plurality of units for producing a product can be done by transmitting the data to the automated manufacturing line of the furniture manufacturing factory from the system according to one or more embodiments of the present invention. It may also be done manually by the furniture manufacturing factory based on drawings produced by the system according to one or more embodiments of the present invention.

Figure 3:
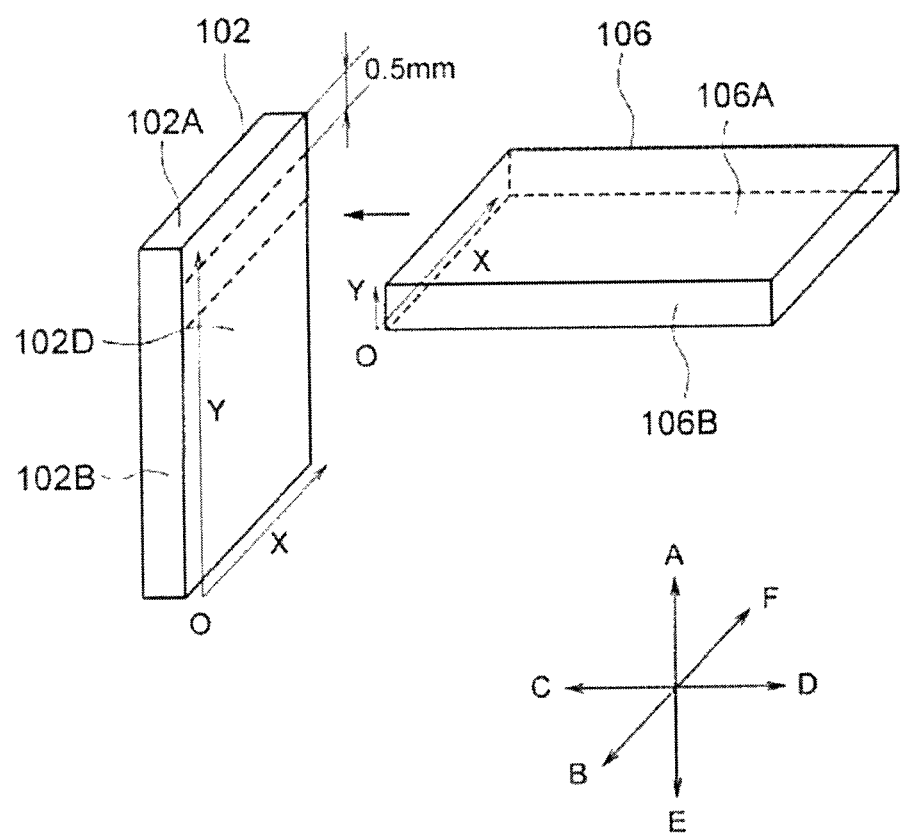
FIG. 3 shows the face-correlation provided between two panels in one embodiment of the present invention.

"Part member face-correlation" in an embodiment of the present invention refers to correlating a face of a part member space with a face of another part member space. A unit space can be constituted by providing face-correlation between the faces of a plurality of part member spaces. The method of part member face-correlation according to one or more embodiments of the present invention is not necessarily limited to a single way. One way is to set a distance between two faces of the two part member spaces to be connected that are in parallel to each other. If the distance between the two faces is zero, both faces are on a same plane. For example, in the case of connecting panel 106 to panel 102 in the direction of the arrow in FIG. 3, the positional relationship between the two panels is determined if the followings are set:

1) Front face 102B of panel 102 and front face 106B of panel 106 are mutually in parallel, and the distance between both faces is zero, and
2) Upper face 102A of panel 102 and upper face 106A of panel 106 are mutually in parallel, and the distance between both faces is designated (0.5 mm in FIG. 3).

In another method, also referring to FIG. 3, the position where one rectangular face of either of panel 102 or panel 106 is connected to a rectangular face of another can be set by XY coordinate system where one corner of the rectangular face is an origin and two sides which extend from the origin are X-axis and Y-axis.

Part member face-correlation may be considered as a rule-setting to impose a restriction on an alteration of dimension of a part member space, by which alteration of a dimension of the other part member space is made in accordance with an input of alteration of a dimension of a part member space.

"Unit/part member face-correlation" in an embodiment of the present invention refers to correlating six faces of the rectangular parallelepiped of the unit space with the faces of the part member spaces of the plurality of part members constituting the unit. By correlating six faces of the unit space with the faces of the plurality of part member spaces constituting the unit space, dimension of the part member spaces can be altered in accordance with the setting of the face-correlation when the alteration of dimension of the unit space is input.

"Accommodation space" in an embodiment of the present invention refers to a space which can accommodate another unit inside a unit entirely or partially. In the example shown in FIG. 4, cabinet 100 which constitutes accommodation space P and the shelf panel 106 (with dowel work provided) which is accommodated in the accommodation space P are two different units. Thus, these units are not face-correlated to each other. However, when a shelf panel is installed in a cabinet of a bookshelf as shown in the example of FIG. 4, if alteration to reduce the dimension of the cabinet is input, the shelf panel can no longer be accommodated in the cabinet unless dimension of the shelf panel is reduced in accordance with the reduction of dimension of the cabinet. By accommodating a unit space of another unit in an accommodation space of an accommodating unit, it becomes possible between two different units to alter the dimension of a unit in accordance with the alteration of dimension of the other unit.

"Accommodation face-correlating" in an embodiment of the present invention refers to providing accommodating/accommodated relationship to the units by giving a "parent" attribute to an accommodating unit, and a "child" attribute to a unit that is accommodated, when a unit is accommodated in an "accommodation space" of another unit. In the example shown in the FIG. 4, cabinet 100 is a parent unit, and shelf panel 106 accommodated in cabinet 100 is a child unit. By providing the accommodation face-correlation between a unit space of an accommodating unit and a unit space of a unit to be accommodated via the accommodation space, the latter unit space can be altered in accordance with the alteration of the former. If the latter unit to be accommodated is composed of a plurality of part members, the dimensions of the part members are altered correspondingly.

"Machining" in an embodiment of the present invention refers to providing a machining work stored in the memory on a face of a part member space. For example, referring to FIG. 8(A), dowel holes are created on side face 106D of shelf panel 106 and on face 101C of right side panel 101 of the cabinet, which corresponds to face 106D, to support and fix shelf panel 106 in cabinet 100. Dowel hole is selected from the memory and provided on a position designated by the XY coordinate system on the rectangular face 106D. Further, referring to FIG. 8(B), when combining the right side panel 101 and top panel 104 such that both panel is joined by mutual butt ends at an oblique angle of 45 degrees with respect to both panels, the junction shown in FIG. 8(B) can be achieved by cutting off upper face 101A of right side panel 101 and right side face 104D of top panel 104 at an oblique angle of 45 degrees. Further, referring to FIG. 8(C), it is also possible to select and provide a cutout work on the corner of shelf panel 106. In this way, by storing types/contents of the machining in the memory, and selecting a machining and applying it on a position designated by the XY coordinate system on the face of the part member space, it becomes possible to provide machining of various shapes on a desired position of the part member.

"Machining transfer" in an embodiment of the present invention refers to transferring a machining work provided at a position on a face of a part member of a furniture product to a position on a corresponding face of another part member, using the face of the part member as a transfer source face. For example in FIG. 8(A), when creating dowel holes which support a shelf panel 106 on the inner face 101C of the right side panel 101 and on the right side face 106D of shelf panel 106, which corresponds to face 101C, destination of transferring machining is designated as "self" and "counterpart" at a XY coordinate position, using face 106D as a transfer source. In this case, "self" is the right side face 106D of shelf panel 106 itself, which is the transfer source face. And "counterpart" is the left side face 101C of right side panel 101. The efficiency of designing furniture can be greatly improved by transferring the machining provided on the position designated by the XY coordinate system on the transfer source face onto the position designated by the XY coordinate system on another face which corresponds to the transfer source.

Embodiment

The system according to one or more embodiments of the present invention may work as an application software which works on the operation system such as Windows (registered trademark). The application programming interface such as OpenGL (registered trademark) is installed as a three-dimensional computer graphic interface between the operation system and the application software of the present design system 1 in one or more embodiments of the present invention.

Figure 1:
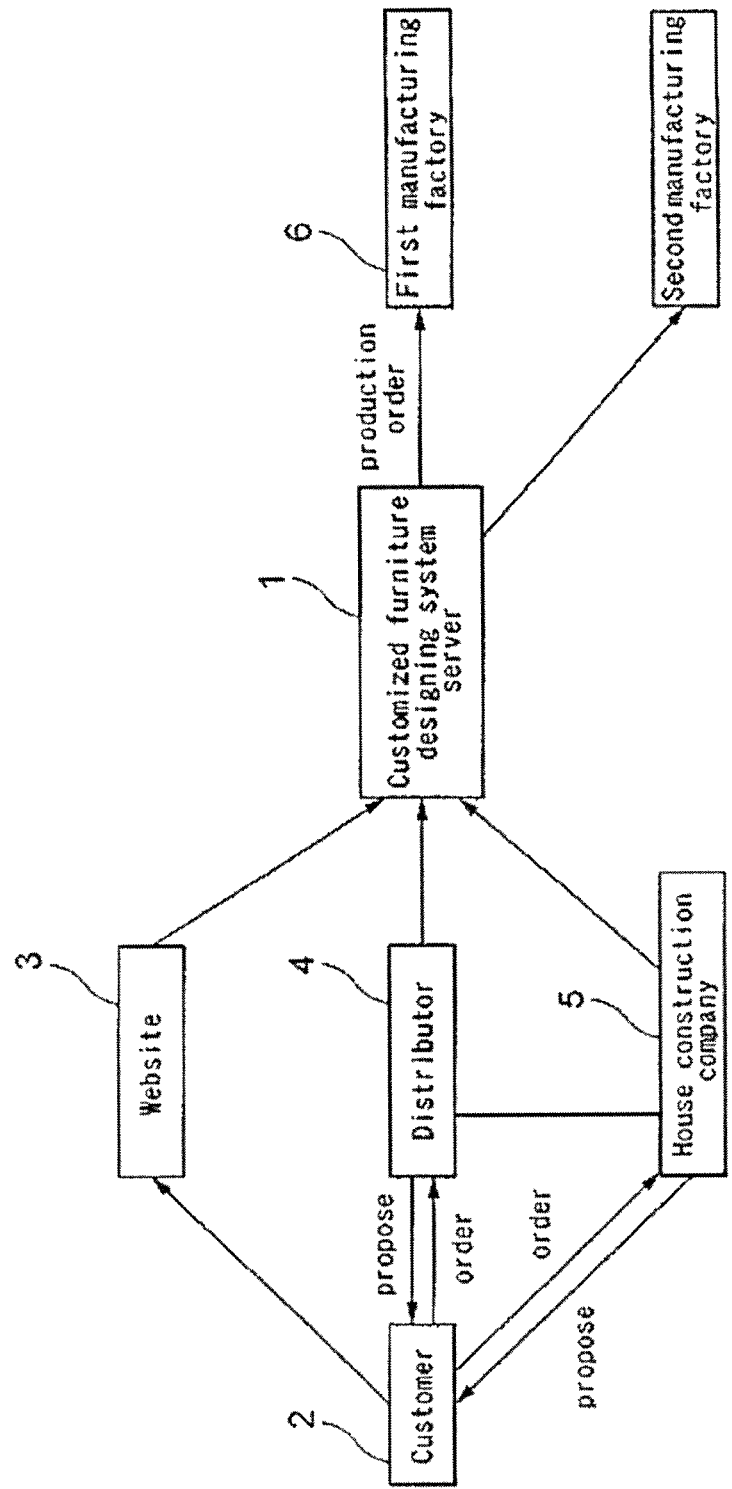
FIG. 1 shows an entire configuration of the system for designing, receiving an order of, and placing a production-order of the custom-made furniture product which is one embodiment of the present invention.

FIG. 1 shows an entire configuration of the system for designing, receiving an order of, and placing a production-order of furniture, which is one embodiment of the present invention. In FIG. 1, a server of the design system 1 for custom-made furniture is connected to PCs of a factory 6, a distributor 4, or a house construction company 5. Further, the design system 1 for custom-made furniture operates website 3.

A distributor 4 or a house construction company 5 proposes a product designed by the design system 1 according to one or more embodiments of the present invention by using PC or a catalogue. After receiving a request of alternation of dimensions or specifications from the customer 2, distributor 4 or house construction company 5 re-proposes the furniture product designed with altered dimensions or specifications with its estimated price and delivery date. Upon receiving a purchase order of the product with re-proposed dimensions, specifications, price, and delivery date from customer 2, the data is transmitted to the server of the design system 1 of custom-made furniture. Upon receiving the purchase order, the server of the design system 1 of custom-made furniture execute calculation of the data necessary for producing the ordered product based on the input data, and transmits the calculated data to factory 6 which cooperates with the design system 1 for production of custom-made furniture. Besides the methods mentioned above, the customer 2 can directly place an order without going through the distributor 4 or the house construction company 5 by accessing the website 3 which is operated by the design system 1 for custom-made furniture, and inputting the data of the desired type and the dimensions of the furniture.

Figure 2:
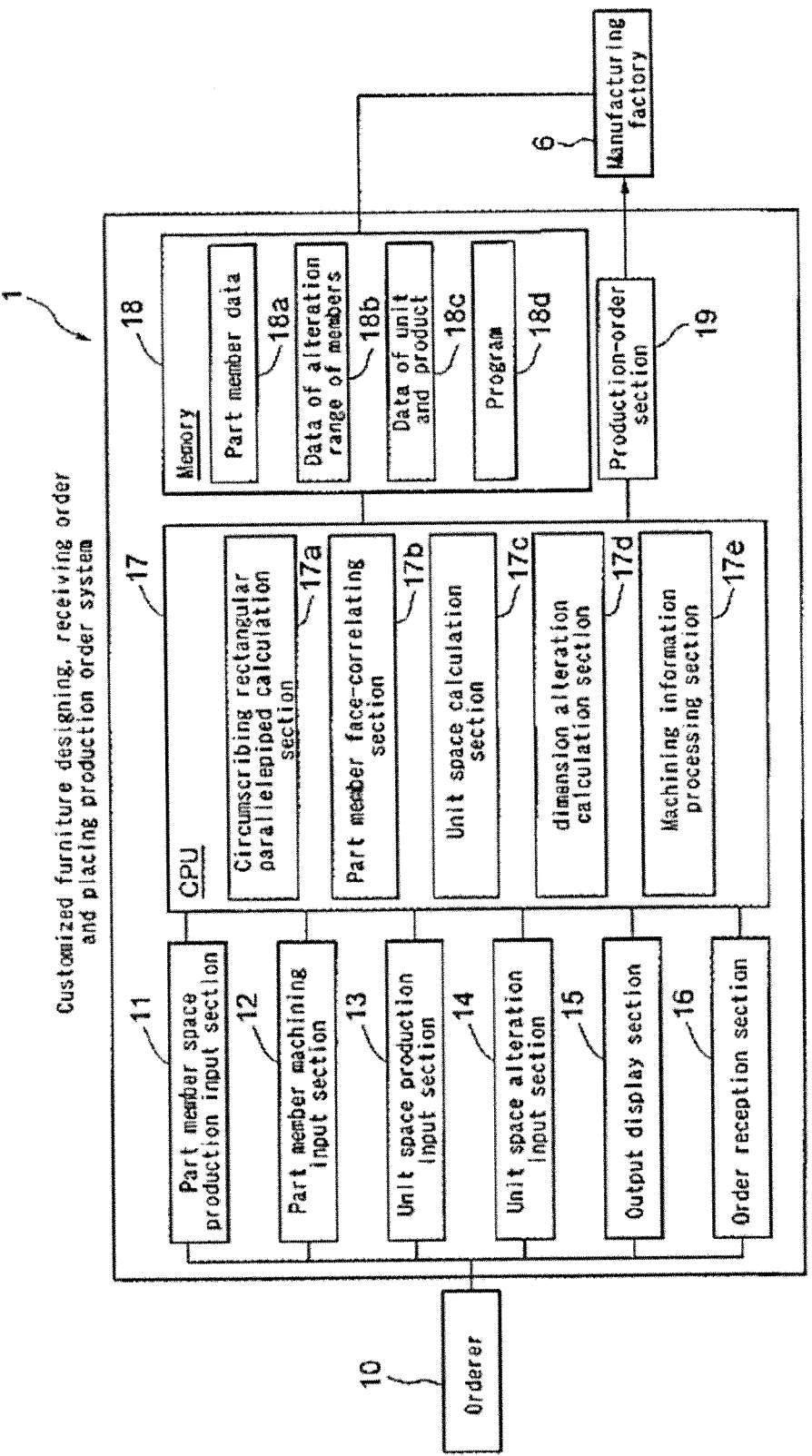
FIG. 2 shows an internal structure of the design system 1 for custom-made furniture product which is one embodiment of the present invention.

FIG. 2 shows an internal structure of the design system 1 of custom-made furniture which is one embodiment of the present invention. The present design system 1 includes part member space production input section 11, part member machining input section 12, unit space production input section 13, unit space alteration input section 14, output display section 15, order reception section 16, central processing unit (CPU) 17, memory 18, and production-order section 19. The present design system 1 can be operated from a PC connected to the server. The orderer 10 reads out data stored in the memory 18, and inputs the desired specifications through part member space production input section 11, part member machining input section 12, unit space production input section 13, and unit space alteration input section 14. The desired specification is calculated and processed by CPU 17, and then the product with altered design is displayed on the output display section 15. The altered product is output and displayed three-dimensionally on a PC screen of the output display section 15. Orderer 10 can decide to place a purchase order after confirming the specification of the displayed product, and can input the purchase order from order reception section 16.

CPU 17 includes circumscribing rectangular parallelepiped calculation section 17a, part member face-correlating section 17b, unit space calculation section 17c, and dimension alteration calculation section 17d, and machining information processing section 17e. Circumscribing rectangular parallelepiped calculation section 17a produces a part member space by calculating a virtual three-dimensional rectangular parallelepiped of each part member and gives a numeric identifier to each of the six faces of the calculated rectangular parallelepiped space. Based on the numeric identifier given, each of the faces of a part member space is correlated with each of the faces of another part member space. Further, CPU 17 can set the XY coordinate system in each of the six faces of the rectangular parallelepiped calculated above, where one corner of the rectangular face is an origin and two sides which extend from the corner are X-axis and Y-axis, and can designate a position on each of the faces by the XY coordinate system.

Upon receiving alteration of dimensions which is input by unit space alteration input section 14, dimension alteration calculation section 17c alters the dimensions of the part member which is correlated (unit/part member face correlation) with altered unit space in accordance with the alteration input based on the face correlation between the face having numeric identifier calculated by the dimension alteration calculation section and the face of another part member which constitutes the same unit.

When machining data is input on a face of a part member by part member machining input means, machining information transfer section transfers the Machining data on another face. The data of the product which is designed by these calculations is given a product number and transmitted from CPU 17 to memory 18 to be stored therein.

Memory 18 consists of, for example, hard disk memory media, RAM, or ROM, and stores master data of part members, alteration range data of part member and unit, and data of unit and product which are designed by input means and designated by product number. Memory 18 also stores a program necessary for executing calculation of one or more embodiments of the present invention and outputting.

When an order of the product designed by the present design system 1 is received by the order reception section 16, production-order section 19 connected to CPU 17 produces bill of materials and bill of machining for part members of the designed product classified by each unit and each product, and then transmits the data with product number to the factory 6. If requested, design drawings will be sent to the factory 6. The present design system 1 may transmit production data to factory 6 without printing out six-plane drawings of the ordered product that was designed in accordance with customer's request, and then the design drawings will be printed out by the factory in their own format.

Embodiment 1

FIG. 4 shows a bookshelf designed by using the system of the embodiment of the present invention. FIG. 5 shows the cabinet of the bookshelf in the FIG. 4. FIG. 6 shows part member face-correlation input in the cabinet of FIG. 5. FIG. 7 shows the unit/part member face-correlation input in the cabinet of FIG. 5.

1. Unit and Part Member
<Product Configuration>

Bookshelf of FIG. 4 includes a cabinet (Unit 1) and a shelf (Unit 2). Part members of Unit 1 comprise right side panel 101 (with dowel holes), a left side panel 102 (with dowel holes), back panel 103, top panel 104, and bottom panel 105. Part members of Unit 2 include shelf panel 106 (with dowel holes), and dowel 107 (four pieces).

2. Unit Production
<Cabinet Production>

Step 1) Produce a cabinet

Cabinet 100 is produced on a screen by reading out the data of panels stored in the memory, dragging and moving the panels read out on a screen, and placing them with adjustment of position and dimensions. In the example of FIG. 5, cabinet 100 consists of five panels (right side panel 101, left side panel 102, back panel 103, top panel 104, and bottom panel 105).

Step 2) Produce a Unit 1 by inputting part member face-correlation between the panels.

First, CPU 17 gives a numeric identifier to each of six faces of the rectangular parallelepiped of each panel in order to provide face-correlation between the panels (part members) constituting cabinet 100. Assuming that the face of the rectangular parallelepiped of each panel are: upper face is A, front face is B, left side face is C, right side face is D, lower face is E, and back face is F, the six faces of the rectangular parallelepiped of each panel are given numeric identifiers as follows:

101A, 101B, 101C, 101D, 101E, 101F for the six faces of the right side panel 101,
102A, 102B, 102C, 102D, 102E, 102F for the six faces of the left side panel 102, 103A, 103B, 103C, 103D, 103E, 103F for the six faces of the back panel 103, 104A, 104B, 104C, 104D, 104E, 104F for the six faces of the top panel 104, and 105A, 105B, 105C, 105D, 105E, 105F for the six faces of the bottom panel 105.

As the procedure of face-correlating, in the example of FIG. 5, face-correlation is started by setting left side panel 102 as a starting panel as follows:

1. Right side face 102D of left side panel 102 and left side face 104C of top panel 104 are in parallel to each other and on the same plane,
2. Right side face 102D of left side panel 102 and left side face 105C of bottom panel 105 are in parallel to each other and on the same plane,
3. Left side face 102C of left side panel 102 and left side face 103C of back panel 103 are in parallel to each other and on the same plane,
4. Front face 102B of left side panel 102 and front face 101B of right side panel 101 are in parallel to each other and on the same plane,
5. Front face 102B of left side panel 102 and front face 104B of top panel 104 are in parallel to each other and on the same plane,
6. Front face 102B of the left side panel 102 and the front face 105B of the bottom panel 105 are in parallel to each other and on the same plane,
7. Back face 102F of left side panel 102 and back face 101F of right side panel 101 are in parallel to each other and on the same plane,
8. Back face 102F of left side panel 102 and back face 104F of top panel 104 are in parallel to each other and on the same plane,
9. Back face 102F of left side panel 102 and back face 105F of bottom panel 105 are in parallel to each other and on the same plane,
10. Back face 102F of left side panel 102 and front face 103B of back panel 103 are in parallel to each other and on the same plane,
11. Upper face 102A of left side panel 102 and upper face 104A of top panel 104 are in parallel to each other and the latter is placed beneath the former by 0.5 mm,
12. Upper face 102A of left side panel 102 and upper face 101A of right side panel 101 are in parallel to each other and on the same plane,
13. Lower face 102E of left side panel 102 and lower face 105E of bottom panel 105 are in parallel to each other and the latter is placed above the former by 0.5 mm,
14. Lower face 102E of left side panel 102 and lower face 101E of right side panel 101 are in parallel to each other and on the same plane,
15. Upper face 102A of left side panel 102 and upper face 103A of back panel 103 are in parallel to each other and on the same plane, and
16. Lower face 102E of left side panel 102 and lower face 103E of back panel 103 are in parallel to each other and on the same plane.

Because left panel 102 and right panel 101 are not adjacent to each other, cabinet 100 cannot be completely defined by the face-correlation starting from the left side panel 102. Therefore, after completing the face-correlation starting from the left side panel 102, top panel 104, faces of bottom panel 105, and the back panel 103 are face-correlated with the face of the right panel 101 as follows:

17. Left side face 101C of right side panel 101 and right side face 104D of top panel 104 are in parallel to each other and on the same plane,
18. Left side face 101C of right side panel 101 and right side face 105D of bottom panel 105 are in parallel to each other and on the same plane, and
19. Right side face 101D of right side panel 101 and left side face 103D of back panel 103 are in parallel to each other and on the same plane.

Part member face-correlation provided above is shown in FIG. 6. The virtual circumscribing rectangular parallelepiped of cabinet 100 produced by the face-correlation between the panels (part members) above is referred to as Unit 1.

Step 3) Input unit/part member face-correlation between the six faces (face A, face B, face C, face D, face E, face F) of Unit 1 and the corresponding faces of part members constituting Unit 1, as follows:

1. Upper face of Unit 1 (face A) and upper face 102A of left side panel 102 are in parallel to each other and distance between the faces is zero.
2. Lower face of Unit 1 (face E) and lower face 102E of left side panel 102 are in parallel to each other and distance between the faces is zero,
3. Left side face of Unit 1 (face C) and left side face 102C of left side panel 102 are in parallel to each other and distance between the faces is zero,
4. Right side face of Unit 1 (face D) and right side face 101D of right side panel 101 are in parallel to each other and distance between the faces is zero,
5. Front face of Unit 1 (face B) and front face 102B of left side panel 102 are in parallel to each other and distance between the faces is zero., and
6. Back face of Unit 1 (face F) and back face 103F of back panel 103 are in parallel to each other and distance between the faces is zero.

Unit/part member face-correlation between the faces of the Unit 1 (cabinet 100) and faces of the part members is shown in FIG. 7. In the embodiment shown in FIG. 5-7, face-correlation is started from left side panel 102, and right side panel 101 which cannot be face-correlated by starting from the left panel is thereafter face-correlated. By this method, cabinet 100 is produced. However, the procedure of face-correlation to produce cabinet 100 is not limited to this way. A different way may be used as long as the unit can be defined.

Further, in FIG. 5-7, cabinet 100 produced by inputting face-correlation between the five part members is referred to as Unit 1. However, as a procedure to define the relationship between the unit and part members, it is also possible to first simply drag and place five panels on a screen to constitute cabinet 100, and then correlate the six faces of Unit 1 with faces of the panels (part member). Specifically, in the example in FIG. 4, the six faces of the cabinet 100 is correlated with each face of the panels as follows: face A with face 102A of panel 102, face B with face 102B of panel 102, face C with face 102C of panel 102, face D with face 101D of panel 101, face E with face 102E of the panel 102, face F with face 102F of panel 102. However, by this method, it is difficult to set a minute positioning, such as making a clearance between part members.

In order to explain part member face-correlation, the method to manually apply face-correlation one by one has been shown. However, it is not necessary that the face-correlation is manually applied one by one. As far as the minimal face-correlation required for defining a unit can be input, the rest of face-correlation can be provided automatically by CPU. However, once a standard unit is produced by face-correlation, the unit can be copied and used repeatedly afterwards. Therefore, even if the first face-correlation is provided manually, it would not cause a heavy burden for the operation in practice.

Step 4) Give a parent attribute.

After completing the face-correlation and application of the machining, "parent" attribute is given to the cabinet 100. By having the parent attribute, it becomes possible for the cabinet 100 to accommodate another unit having a "child" attribute in its accommodation space.

Step 5) Produce a shelf panel 106

In an embodiment of the present invention, a composite panel having a butt end sheet attached on the butt end face of the core plate and a surface sheet attached on the upper and lower surface of the core plate as shown in FIG. 13(A) is read out from the memory to produce shelf panel 106. In the composite panel shown in FIG. 13(A), a surface sheet is attached on top and bottom surface of the core plate, and a butt end sheet is attached on all four side faces of the core plate. The composite panel space is constituted by the face-correlation (part member face-correlation) between the faces of the core plate space and the surface sheet space.

Figure 13B:
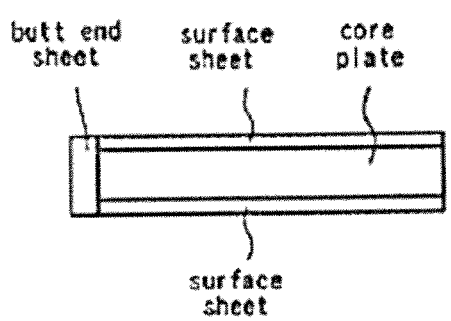

Referring to FIG. 9 and FIG. 13(B), in the face-correlation of the core plate, the butt end sheet, and the composite panel, width of the composite panel is set 420 mm. As shown in FIG. 13(B), the composite panel is altered so that a butt end sheet is not attached to the right butt end. As a simple method to make this alteration, thickness of the butt end sheet on right butt end may be altered to zero. In this case, because the composite panel is set to maintain a constant width by the part member face-correlation, total of width of the core plate and the surface sheet are altered to from 369 mm 369.5 mm by adding thickness (0.5 mm) of the deleted butt end sheet.

Figure 13C:
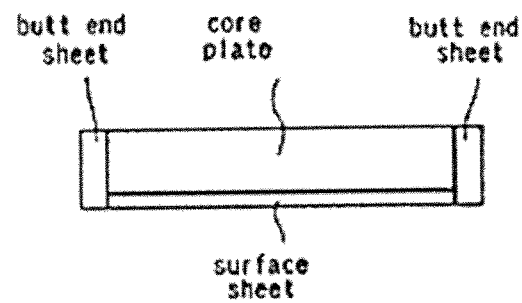
Figure 14:
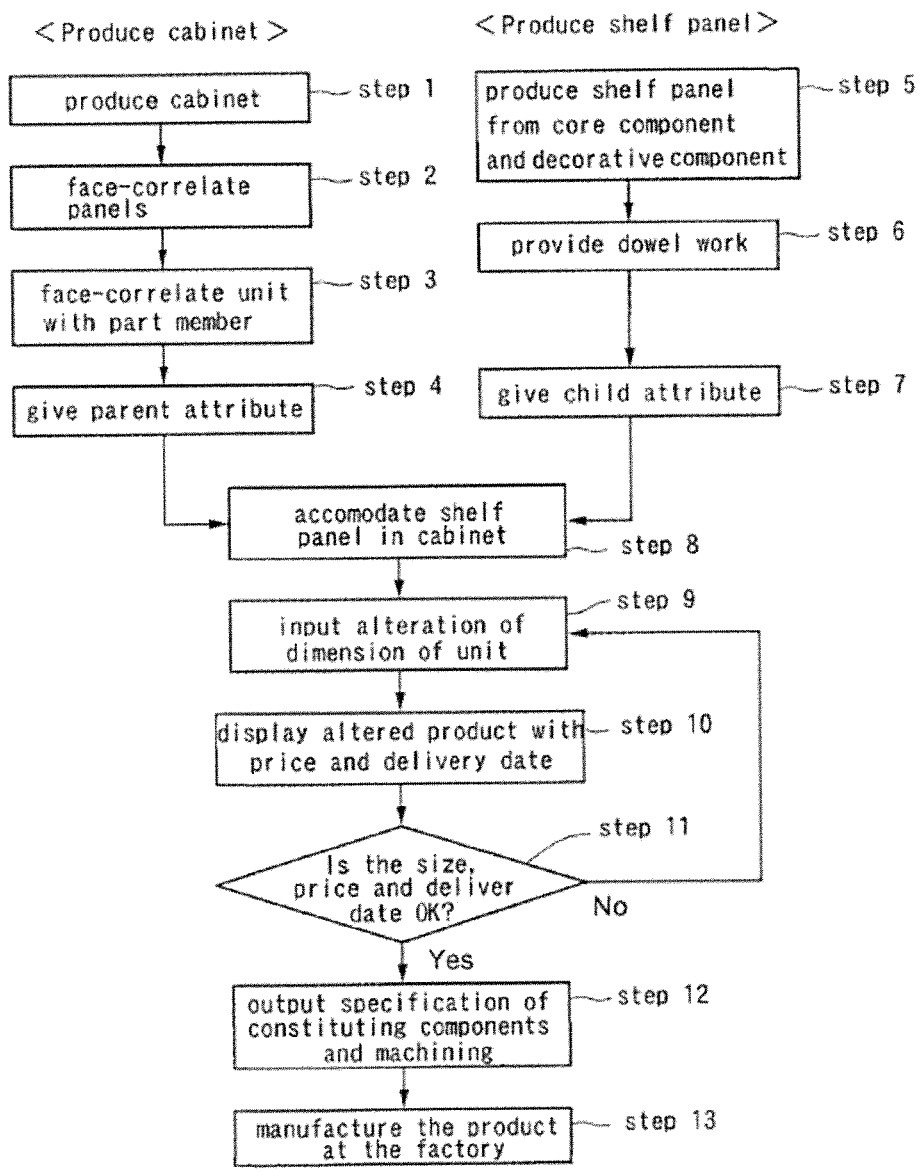
FIG. 14 shows a flowchart of designing, receiving an order of, and placing a production-order of a custom-made furniture product by using the system which is one embodiment of the present invention.

Similarly, referring to FIG. 9 and FIG. 13(C), in the face-correlation between the core plate and the butt end sheet, thickness of the composite panel is set 15 mm. As shown in FIG. 13(C), the composite panel is altered so that a surface sheet is not attached on the upper surface. As a simple method to make this alteration, thickness of the surface sheet on the upper face may be altered to zero. In this case, because the composite panel is set to maintain 15 mm in thickness by the face-correlation, the core plate is altered from 10 mm to 12.5 mm in thickness by adding thickness (2.5 mm) of the deleted upper surface sheet.

In the following steps, explanation will be made assuming that the shelf panel 106 is used as the composite panel having the structure shown in FIG. 13(A).

Step 6) Provide dowel work on the shelf panel 106.

In an embodiment of the present invention, dowel work refers to a machining which bores dowel holes on the inner side faces of the cabinet and outer side faces of the shelf panel 106 at positions corresponding to each other, and small approximately cylindrical dowels are inserted into the dowel hole to fix the shelf at a certain height inside the cabinet. In an embodiment of the present invention, the dowel work is required to be done at least at four positions for supporting and fixing the shelf inside the cabinet.

Figure 8A:
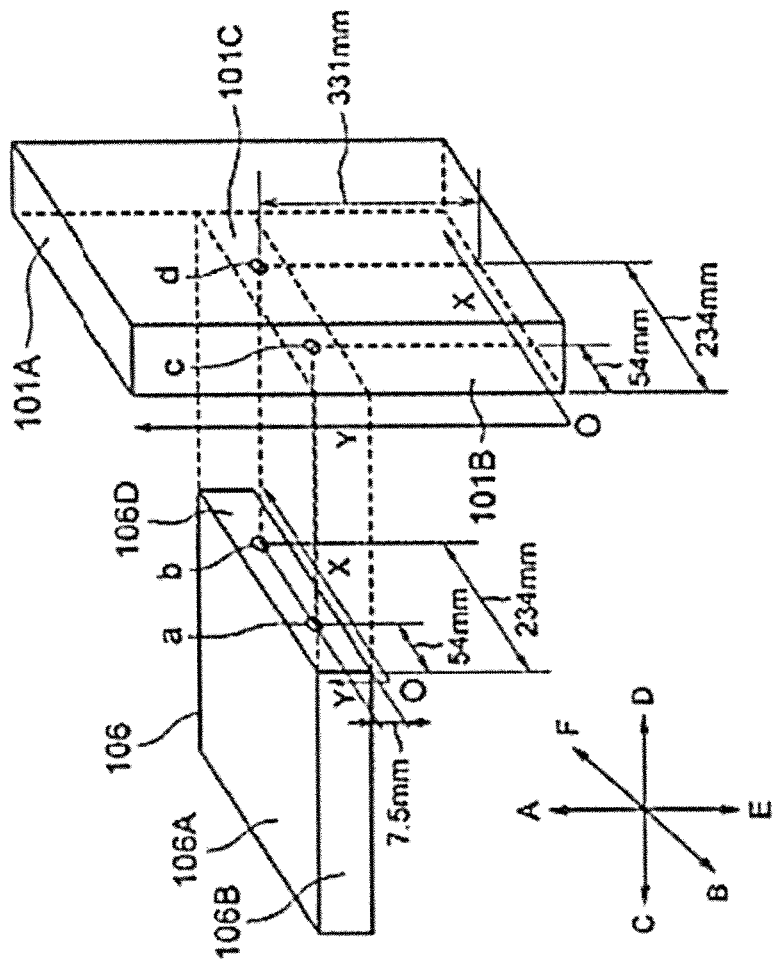
FIG. 8(A) shows an example where a dowel work is provided on the shelf panel 106 and the right side panel 101 of the bookshelf designed with the system which is one embodiment of the present invention.
Figure 8B:
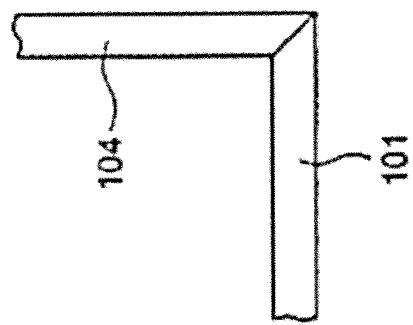
FIG. 8(B) shows another example of the joint between top panel 104 and right side panel 101 of the bookshelf designed by using the system which is one embodiment of the present invention.
Figure 8C:
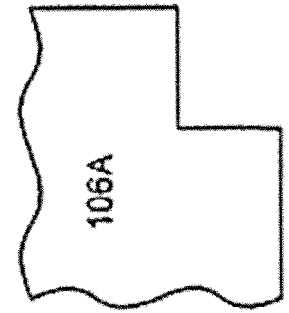
FIG. 8(C) shows an example where the cutout work is provided on the corner of the shelf panel 104A of the bookshelf designed with the system which is one embodiment of the present invention.

Referring to FIG. 8(A), XY coordinate system is set such that the lower left corner of the rectangular right side face 106D of the shelf panel 106 is an origin, and two sides which extend from the origin are X-axis and Y-axis, and the XY coordinate positions for providing the dowel holes "a" and "b" are designated. In FIG. 8(A). the coordinate position of "a" is (54 mm, 7.5 mm), and the coordinate position of "b" is (234 mm, 7.5 mm). Then, application of machining at these positions is input by the machining input means. When inputting an instruction to provide the machining, a dowel hole is selected, and destination of machining is designated as "self" and "counterpart". Then, because right side face 106D of the shelf panel 106 is designated "self" as the destination of the machining, the dowel hole is provided at the coordinate position of "a" and "b" of the right side face 106D. On the other hand, because the shelf panel is not yet installed in the cabinet at this moment, the machining is not provided on the "counterpart" (face 101C).

Similarly, XY coordinate system is set such that the lower left corner of the rectangular left side face 106C of the shelf panel 106 is an origin, and two sides which extend from the origin are X-axis and Y-axis, and the XY coordinate positions for providing the dowel holes are designated. When an instruction is input to provide the dowel work at the positions of "self" and "counterpart", dowel work is provided on the left side face 106C of the shelf panel 106. On the other hand, because the shelf panel is not yet installed in the cabinet at this moment, machining is not provided on the "counterpart" (the face 102D).

Step 7) Give a "child" attribute.

Because the shelf panel 106 installed in the cabinet is a unit by itself, and used as a shelf of the bookshelf with dowel work provided, "child" attribute is given to the shelf panel.

3. Produce a Furniture Product by Combining Units.

Step 8) Accommodate a shelf in a cabinet.

Shelf panel 106 is dragged and installed at a desired position of the inner space (accommodation space) P, which is constituted by side panels 101, 102, top panel 104, bottom panel 105, and back panel 103 of the cabinet 100 as shown in FIG. 4.

Accommodation space P is defined by side panels 101, 102, top panel 104, bottom panel 105, and back panel 103, which are all part members of the cabinet 100. Shelf panel 106 inscribes inner face of the accommodation space P in a state that the shelf panel 106 is accommodated therein. Shelf panel 106 is accommodation face-correlated with the accommodation space P at four faces (face B, face C, face D, face F) of the shelf panel 106. Based on giving "parent" attribute to cabinet 100 and "child" attribute to shelf panel 106, shelf panel 106 is accommodation face-correlated with cabinet 100 via accommodation space P.

In the example of FIG. 4, when the accommodation face-correlation is provided at the position where a shelf panel is dragged and installed, accommodation relationship between cabinet 100 and shelf panel 106 is set based on the parent attribute given to the cabinet and the child attribute given to the shelf panel, in accordance with the setting of the accommodation face-correlation.

When shelf panel 106 is accommodated in the accommodation space of the cabinet, because the dowel holes provided on the right side face 106D of shelf panel 106 are also provided on the "counterpart", the dowel holes are transferred onto the corresponding XY coordinate position of 101C which is in parallel with and opposes to the right side face 106D of the shelf panel 106.

Step 9) Input alteration of a dimension of the unit.

Referring to FIGS. 5, 6, and 7, operation of altering height of cabinet 100 (Unit 1) from 700 mm to 690 mm by lowering the height by 10 mm is explained.

In FIG. 7, top face (face A) of Unit 1 is unit/part member face-correlated with top face 102A of left side panel 102. Therefore, if Unit 1 is altered to 690 mm in height, top face 102A of left side panel 102 is moved downward by 10 mm in accordance with the relationship set by the face-correlation (distance between the two is zero).

Then, referring to FIG. 6, top face 102A of left panel 102 is face-correlated with top face 104A of the top panel 104 by setting both faces mutually in parallel and the distance between the two faces is 0.5 mm. Therefore, top face 104A of top panel 104 is moved downward by 10 mm while maintaining the relationship that top face 104A of top panel 104 is separated from top face 102A of left side panel 102 by 0.5 mm. Further, because top face 102A of left side panel 102 is face-correlated with top face 101A of right side panel 101 and top face 103A of back panel 103 by setting the distance between the two faces zero, top face 101A and top face 103A are also moved downward by 10 mm correspondingly when top face 102A is moved downward by 10 mm. As a result, due to the alternation input which sets the height of Unit 1 to be 690 mm, height of part members 101, 102, 103 are lowered by 10 mm to be 690 mm.

Next, referring to FIGS. 5, 6, and 7, operation of altering width of cabinet 100 (Unit 1) from 400 mm to 500 mm is explained.

In FIG. 7, right face (face D) of Unit 1 is unit/part member face-correlated with right side face 101D of right side panel 101. Therefore, if Unit 1 is altered to be 500 mm in width, right face 101D of right side panel 101 is moved rightward by 100 mm in accordance with the face-correlation (distance between the two faces is zero). Then, in FIG. 6, because right side face 101D of right side panel 101 is face-correlated with right side face 103D of back panel 103 by setting both faces are in parallel to each other and the distance between the two faces is zero, right side face 103D of back panel 103 is moved rightward by 100 mm while maintaining the relationship that the distance between right side face 101D of right side panel 101 and right side face 103D of back panel 103 is zero.

Further, left side face 101C which is opposite side of right side face 101D of right side panel 101 is face-correlated with right side face 104D of top panel 104 and right side face 105D of bottom panel 105. Therefore, if right side panel 101 is moved rightward, face-correlation with right side face 104D of top panel 104 and right side face 105D of bottom panel 105 also controls the alteration of dimensions besides the face-correlation between 101D and 103D.

When right side face (face D) of Unit 1 moves rightward by 100 mm, because right side panel 101 has a constant thickness, left side face 101C of the right side panel 101 is also moved rightward by 100 mm. Referring to FIG. 6, because left side face 101C of right side panel 101 is face-correlated with right side face 104D of top panel 104 and right side face 105D of bottom panel 105, both faces of 104D and 105D are moved rightward by 100 mm correspondingly with face 101C in accordance with the relationship set in FIG. 6 (distance between two faces is zero). As a result, due to the alternation of the width of Unit 1 from 400 mm to 500 mm, width of top panel 104, bottom panel 105, and back panel 103 are increased by 100 mm Further, when dimensions of Unit 1 are altered as shown above, the accommodation space P which is constituted by right side panel 101, left side panel 102, back panel 103, top panel 104, and bottom panel 105 is altered to be 659 mm in height, 470 mm in width, 285 mm in depth. Then, dimensions of the rectangular parallelepiped of shelf panel 106 which is given a child attribute and inscribing the accommodation space P of Unit 1 are correspondingly altered in accordance with the accommodation face-correlation.

Further, referring to FIGS. 5, 6, 7, 8(A)-8(C), and 10(A)-10(B), the operation which moves the shelf panel 106 which is accommodated in the cabinet 100 (Unit 1) downward by 10 mm is explained.

In FIG. 8(A), shelf panel 106 is installed at the position where the lower face 106E of shelf panel 106 is separated from lower face 101E of right side panel 101 by 323.5 mm (331 mm-7.5 mm). In shelf panel 106 and right side panel 101, face correlation is provided between face 101C and face 106D, between face 101B and face 106B, and between face 101F and face 106F respectively such that the two faces are in parallel each other and distance therebetween is zero. However, because the distance between face 101A and face 106A, and between face 101C and face 106C are not fixed by face-correlation, the distance between these two faces can be altered freely. Shelf panel 106 is moved downward by 10 mm so that distance between lower face 106E and lower face 101E of right side panel 101 becomes 321 mm. Then, as shown in FIG. 10(B), Y-coordinate positions of dowel hole "a" and "b" on face 106D, and "c" on face 101C (transferred from 106D) and "d" on face 101C (transferred from 106D) are moved downward by 10 mm respectively in the XY coordinate system set on face 106D and face 101C respectively.

Step 10) Calculate and display specifications, estimated price, and delivery date of a designed bookshelf.

An estimated price and a delivery date of the designed bookshelf after the alteration of dimension in Step 9) are calculated based on the price and the procurement period of the part members which constitute the bookshelf, and the result of the calculation is displayed on a PC screen with the three-dimensional image of the designed bookshelf.

FIG. 15 shows an example of master data of the price and the procurement period of the part members which constitute the bookshelf in an embodiment of the present invention. Price and procurement period of part members are transmitted from factory 6 of FIG. 1 and FIG. 2 and stored in memory 18 of FIG. 2.

In an embodiment of the present invention, the estimated price of the product is calculated based on the price information of each of the part members stored in the master data of the part members by adding wages to the total amount of the part members used in the production of the product. The delivery date of the bookshelf is calculated based on the part member with the longest procurement period among the plurality of part members which are used in producing the product and stored in the master data of the part members.

Step 11) Inquire to a customer whether specifications, estimated price, and delivery date of the product are acceptable.

A three-dimensional image of the bookshelf whose dimensions are altered by inputting the alteration of the unit is output and displayed on a PC screen. If the customer is satisfied with the specification, the estimated price, and the delivery date of the product output on a screen, the customer decides to purchase the proposed furniture. If the customer is not satisfied with the specification, the estimated price, or the delivery date displayed on a PC screen, and wants further alteration, the customer goes back to the step of alteration input of Step 9).

In the system in an embodiment of the present invention, means for joining part members, such as adhesive or nails, etc. is not designated. These can be input as a kind of machining to part member(s). As an alternative, the means for joining part members can be determined by the manufacturing factory which works together with the operation of the present system instead of designating the means by the system according to one or more embodiments of the present invention.

4. Place a Production-Order of a Product.

Step 12) Send the data of production a product ordered by a customer to a factory.

In an embodiment of the present invention, following production data are provided to the factory: 1. Bill of materials for part members (BOM data), 2. Bill of machining (NC data), and 3. Design drawings.

1. Bill of Materials (BOM Data)

FIG. 9 shows data of bill of materials (BOM data) of part members of the bookshelf of FIG. 4 which is designed by the system in an embodiment of the present invention. The bookshelf is given a product number 001. The two units which constitute the bookshelf (the cabinet and the shelf) are given unit number 1 and unit number 2. Each of the part members of Unit 1 and Unit 2 is given part member number. Each part member is provided with designated material, width, height, thickness, and number of pieces.

2. Bill of Machining (NC Data)

FIG. 10(A) shows the machining data (NC data) provided on shelf panel 106 and right side panel 101 shown in FIG. 8(A), of the bookshelf designed by the system in an embodiment of the present invention. FIG. 10(B) shows the machining data (NC data) when shelf panel 106 is moved downward by 10 mm.

While the machining provided on the bookshelf in an embodiment of the present invention is dowel work provided on right side panel 101, left side panel 102 and shelf panel 106, FIGS. 10(A) and 10(B) show only the dowel work provided on left face 101C of right side panel 101 and right side face 106D of shelf panel 106. Although the dowel work is also provided on face 102D of left side panel 102 and left side face 106C of shelf panel 106 in the same manner, the description of its bill of machining (NC data) is omitted.

3. Design Drawings

FIGS. 11(A), 11(B), and 11(C) respectively show a plan view, front view, and right side view of the bookshelf in FIG. 4 which is designed by the system of the embodiment of the present invention. FIGS. 12(A)-12(F) show front view, plan view, and right side view of (A) right side panel, (B) left side panel, (C) top panel, (D) back panel, (E) bottom panel, and (F) shelf panel 106 respectively. Because (F) shelf panel 106 is a composite panel, applications of surface sheet and butt end sheet attached on the six faces of shelf panel 106 are shown.

Step 13) Transmit a bill of materials (BOM data) and a bill of machining (NC data) to a factory, and the factory produce a product using the data.

A factory which works together with the present system can produce an ordered furniture product by their automated manufacturing line by receiving the bill of materials (BOM data) in FIG. 9 and the NC data in FIGS. 10(A)-10(B). The factory can also produce the ordered furniture product by the conventional method based on the design drawings shown in FIGS. 11(A)-11(C), and FIGS. 12(A)-12(F) instead of using the automated manufacturing line. In another alternative, the factory may use both automated manufacturing line and conventional production method to produce the ordered furniture product.

In the embodiment described above, a bookshelf which has the simplest structure is referred to as a furniture product for convenience of explanation of the present invention. However, one or more embodiments of the present invention are applicable to a furniture product with more complex structure which includes a drawer, and an opening/closing door, etc. Further, although a component of a furniture product is considered as its circumscribing rectangular parallelepiped and constitutes the furniture product by using its circumscribing rectangular parallelepiped in the embodiment above, the application of the present invention is not limited to the structure constituted by rectangular parallelepiped components. As long as face-correlation can be provided, one or more embodiments of the present invention are applicable for the structure constituted by polyhedron components such as pentahedron, heptahedron, and octahedron, etc. Further, as long as a XY coordinate system can be set on a face of a component, the machining can be provided on the face of the component of the furniture product without regard to whether the face-correlation is provided or not.

The invention claimed is:

1. A method for designing and customizing a furniture product on a screen of a computer, comprising:
    displaying a plurality of rectangular parallelepiped spaces as a plurality of part member spaces on a screen, wherein a dimension of each part member space can be altered by moving a face of the part member space;
    assembling the plurality of part member spaces on the screen such that the plurality of the part member spaces form a furniture product,
        wherein the plurality of part member spaces comprise a first part member space and a second part member space that is perpendicularly connected to the first part member space, dimensions of the first part member space and the second part member space are fixed in thickness and unfixed in length and width thereof;
    providing a part member face-correlation between a face of the first part member space and a face of the second part member space that is in parallel with the face of the first part member space such that a distance between the face of the first part member space and the face of the second part member space is fixed by a predetermined millimeter;
    moving the face of the first part member space by a predetermined distance in a perpendicular direction to the face so that the face of the second part member space that is part member face-correlated with the face of the first part member is moved in accordance with the part member face-correlation to alter the dimensions of the part member spaces without altering the thickness of the part member spaces; and
    displaying a three-dimensional image of the furniture product on the screen after the alteration of dimensions of the part member spaces.

2. The method of claim 1,
    wherein the plurality of part member spaces further comprises a third part member space having dimensions of fixed thickness and unfixed length and width, and
    wherein a part member face-correlation is provided between a face of the second part member space and a face of the third part member space that is in parallel with the face of the second part member space, and upon moving the face of the first part member space, the face of the third part member space is moved in accordance with the part member face-correlation provided between the face of the second part member space and the face of the third part member space.

3. The method of claim 1, wherein upon moving the face of the first part member space, length and width of the first part member space is altered without altering thickness, and position of the second part member with respect to the first part member space is changed without altering dimensions of the second part member space.

4. The method of claim 1, wherein the plurality of part member spaces form a cabinet, and the first part member space is a side panel of the cabinet and the second part member space is a top panel of the cabinet.

5. The method of claim 1, further comprising:
calculating a unit space that circumscribes the first part member space and the second part member space;
fixing a distance between the face of the first part member space and a face of the unit space that is in parallel with the face of the first part member space; and
moving the face of the unit space so that the face of the first part member space and the face of the second part member space are moved in accordance with the part member face-correlation.

6. A system for designing and customizing a furniture product on a screen of a computer, comprising:
a display that displays a plurality of rectangular parallelepiped spaces as a plurality of part member spaces on a screen, wherein a dimension of each part member space can be altered by moving a face of the part member space;
an assembling section that assembles the plurality of part member spaces on the screen such that the plurality of the part member spaces form a furniture product,
wherein the plurality of part member spaces comprise a first part member space and a second part member space that is perpendicularly connected to the first part member space, dimensions of the first part member space and the second part member space are fixed in thickness and unfixed in length and width thereof;
a part member face-correlation section that provides a part member face-correlation between a face of the first part member space and a face of the second part member space that is in parallel with the face of the first part member space such that a distance between the face of the first part member space and the face of the second part member space is fixed by a predetermined millimeter;
a part member movement section that moves the face of the first part member space by a predetermined distance in a perpendicular direction to the face so that the face of the second part member space that is part member face-correlated with the face of the first part member is moved in accordance with the part member face-correlation to alter the dimensions of the part member spaces without altering the thickness of the part member spaces; and a display that displays a three-dimensional image of the furniture product on the screen after the alteration of dimensions of the part member spaces.

7. The system of claim 6,
wherein the plurality of part member spaces further comprises a third part member space having dimensions of fixed thickness and unfixed length and width, and
wherein a part member face-correlation is provided between a face of the second part member space and a face of the third part member space that is in parallel with the face of the second part member space, and upon moving the face of the first part member space, the face of the third part member space is moved in accordance with the part member face-correlation provided between the face of the second part member space and the face of the third part member space.

8. The system of claim 6,
wherein upon moving the face of the first part member space, length and width of the first part member space is altered without altering thickness, and
wherein position of the second part member with respect to the first part member space is changed without altering dimensions of the second part member space.

9. The system of claim 6,
wherein the plurality of part member spaces form a cabinet, and
wherein the first part member space is a side panel of the cabinet and the second part member space is a top panel of the cabinet.

10. The system of claim 6, further comprising:
a unit space calculation section that calculates a unit space that circumscribes the first part member space and the second part member space;
a unit/part member face-correlation section that fix a distance between the face of the first part member space and a face of the unit space that is in parallel with the face of the first part member space; and
a unit space movement section that moves the face of the unit space so that the face of the first part member space and the face of the second part member space are moved in accordance with the part member face-correlation.

* * * * *